United States Patent [19]

Nazarathy et al.

[11] Patent Number: 5,253,309
[45] Date of Patent: Oct. 12, 1993

[54] OPTICAL DISTRIBUTION OF ANALOG AND DIGITAL SIGNALS USING OPTICAL MODULATORS WITH COMPLEMENTARY OUTPUTS

[75] Inventors: Moshe Nazarathy, Palo Alto; Josef Berger, Santa Clara, both of Calif.

[73] Assignee: Harmonic Lightwaves, Inc., Santa Clara, Calif.

[21] Appl. No.: 370,711

[22] Filed: Jun. 23, 1989

[51] Int. Cl.$^5$ ............................................... G02B 6/12
[52] U.S. Cl. .......................................... 385/4; 385/1; 385/7; 385/8
[58] Field of Search ................ 350/96.11, 96.12, 96.13, 350/96.14, 96.15; 455/602; 385/1, 2, 4, 7, 8, 27

[56] References Cited

U.S. PATENT DOCUMENTS

| 4,320,475 | 3/1982 | Leclerc et al. | 385/1 X |
| 4,820,009 | 4/1989 | Thaniyavarn | 350/96.13 |
| 4,856,093 | 8/1989 | Mohr | 359/192 |
| 4,984,861 | 1/1991 | Suchoski, Jr. et al. | 350/96.12 |

FOREIGN PATENT DOCUMENTS 0250819 1/1988 European Pat. Off.
0329186 8/1989 European Pat. Off.

OTHER PUBLICATIONS

"Microwave Packaging of Optoelectronic Components", Schlafer et al., *IEEE* vol. 38, No. 5, May 1990, pp. 518–523.

"Integrated-Optical 2×2 Switch and y-Branch Mode Splitters", Johnson et al., Integrated and Guided-Wave Optics, vol. 5, Mar. 1988, pp. 236–243.

"Optical Two-Guide Switches in GaAs: Ideal and Nonideal Operation" Molter et al., *Integrated and Guided-Wave Optics*, vol. 5, Mar. 1988, pp. 248–251.

"A Synthesized Digital Switch Using a 1×2 Directional Coupler with Asymmetric $\Delta\beta$ Phase Reversal Electrode", Thaniyavarn Integrated and Guided-Wave Optics, vol. 5, Mar. 1988, pp. 256–259.

Voltage-tunable Wavelength Filtering with a Non-symmetric Interferometer, Jackel et al., Integrated and Guided Wave Optics, vol. 5, Mar. 1988, pp 256–259.

High-Speed Ti:LiNBO$_3$ Switch/Modulators: Recent Advances and Applications Korotky, Integrated and Guided Wave Optics, Vol. 5, Jan. 1988.

(List continued on next page.)

*Primary Examiner*—John D. Lee
*Assistant Examiner*—Stephen W. Barns
*Attorney, Agent, or Firm*—Steven F. Caserza

[57] ABSTRACT

A novel optical system is taught including an optical source, an optical modulator having at least one optical input port for receiving the optical signal from the optical source, a modulation port for receiving the optical signal from the optical source, a modulation port for receiving a modulating signal, and complementary output port signals. The complementary modulated output signals are applied to one or more optical receivers at the other end of an optical transmission link. In one embodiment, the two complementary signals are provided to two separate optical receivers, thereby allowing distribution of optically modulated signals, for example, in a cable television or other type distribution system. In another embodiment, the two complementary modulated signals are applied to a single balanced receiver, thereby providing information content to the complementary receiver twice the power level available on either one channel alone. Furthermore, utilizing a balanced receiver, common mode error signals cancel, thereby increasing the signal to noise ratio of the system. In one embodiment of this invention, a single optical transmission channel is used, and the two optically modulated signals are separated in polarization so as to be capable of being separately detected on the receiving end of the link. In one embodiment feedback means is used to insure proper polarization states for the two complementary signals.

46 Claims, 8 Drawing Sheets

OTHER PUBLICATIONS

"Lithium Niobate Band Pass Response Microwave Modulator with Phase Reversal Reversal Electrodes" Hiser et al. Integrated and Guided Wave Optics, vol. 5 Mar. 1988, pp. 361–364.

High Speed Ti:LiNbO3 Interferometric Activated Switch:IAX Pohlman et al. Integrated and Guided-Wave Optics, vol. 5, Mar. 1988, pp. 365–368.

High Frequency Intrinsic Resonance In Traveling Wave Y-Fed Directional Coupler Bourbin et al., Integrated and Guided Wave Optics, vol. 5, Mar. 1988, pp. 373–376.

Thermally Stabilized 1×4 Ti:LiNbO3 Waveguide Switch, Mekada et al. Integrated Guided-Wave Optics, vol. 4, Feb. 1989, pp. 6–9.

An Integrated InP/InGaAs Heterojunction Bipolar Photoreceiver, Chandrasekhar et al. Integrated and Guided-Wave Optics, vol. 4, Feb. 1989, pp. 178–181.

"An Interdigitated M-S-M Waveguide Photodetector", Soole et al., Integrated and Guided Wave Optics, vol. 4, Feb. 1989, pp. 182–185.

"Low-Voltage Low-Crosstalk 8×8 Ti:LiNbO3 Switch for a Time-multiplexed Switching System", Veselka et al., Optical Fiber Communication, Feb. 1989 THB2.

Koscinski "Feasibility of Multichannel VSB/AM Transmission on Fiber Optic Links", NTCA Tech Papers (Jan. 1987) p. 17.

Stephens et al., "System Characteristics of Direct Modulated and Externally Modulated RF Fiber-Optic Links," *Journal Lightwave Technol.*, (Feb. 1987) LT-5:1-80-387.

Bodeep et al., "Comparison of Second and Third Order Distortion in Intensity Modulated InGaAsP Lasers and an LiNbO3 External Modulator," Paper WK2, Conference on Optical Fiber Communications (Dec. 1989).

Betts et al., "High Sensitivity Optical Analog Link Using an Extension Modulator," CLEO (1989) Apr. 24–28, Paper TUJ19, Baltimore, Md.

Ridder et al., "Feedforward Compensation of Integrated Optic Modulator Distortion" Optical Fiber Communication of OFC 1990, San Francisco, Jan. 1990 pp. 78–79.

Mauer et al., "New Integrated-Optic Modulator Design for AM Video Transmission Optical Fiber Communication OFC 1991, Feb. 21, 1991.

Childs et al., "High Dynamics Range Fiber Optic Link Using External Modulator Diode Pumped Nd:YAG Lasers", *SPIE*, vol. 1371, High-Frequency Analog Fiber Optice Systems, pp. 223–232.

Kasemset et al., "A Comparison of Alternative Modulation Techniques for Microwave Optical Links", *SPIE*, vol. 1371:104–114, High Frequency Analog Fiber Optic Systems (Jan. 1990).

Liu, "Photonic Computer Aided Design Tools for High Speed Optial Modulators", *SPIE*, vol. 1371:46–55, High Frequency Analog Fiber Optic Systems (Jan. 1990).

Pan et al., "Microwave High Dyanmic Range EO Modulators", *SPIE*, vol. 1371: 21–35, High Frqeuency Analog Fiber Optic Systems (Jan. 1990).

Johnson et al., "Integrated-Optical Modulators for Bandpass Analog Links", *SPIE*, vol. 1371:2–12, High Frequency Analog Fiber Optic Systems (Jan. 1990).

Betts et al., "High Performance Optical Analog Link Using External Modulator" *IEEE Photonics Technology Letters*, vol. 1, No. 11, pp. 404–406, Nov. 1989.

Trisno et al., "Nd:YAG Light Source and External Modulator for a VSB-AM Video Transmitter", Jan. 1990 NCTA Technical Papers, pp. 206–212.

Bodeep et al., "Semiconductor Lasers Versus External Modulators: A Comparison of Nonlinear Distortion for Lightwave Subcarrier CATV Applications", *IEEE Photonics Technology Letters*, vol. 1, No. 11, pp. 401–403, Nov. 1989.

Cox et al., "An Analytic and Experimental Comparison of Direct and External Modulation in Analog Fiber-Optic Links", *IEEE Transactions on Microwave Theory and Techniques*, vol. 38, No. 5, pp. 501–509, May 1990.

Childs et al., "Multichannel AM Video Transmission Using a High-Power Nd:YAG Laser and Linearized External Modulator", *IEEE*, vol. 8, No. 7, Sep. 1990, pp. 1369–1376.

Werth et al., "External Modulation: A Plush for Optical Links", *Lasers & Optronics*, pp. 42–47, May 1991.

Chiddix, "Fiber Backbone Trunking in Cable Television Networks: An Evolutionary Adoption of New Technology", *IEEE LCS Magazine*, vol. 1, No. 1, Feb. 1990 pp. 32–37.

(List continued on next page.)

OTHER PUBLICATIONS

Darcie et al., "Lightwave Subcarrier CATV Transmission Systems", *IEEE Transactions on Microwave Theory and Techniques*, vol. 38, No. 5, May 1990, pp. 524–533.

Childs, "AM Video Transmission", GTE Laboratories, Inc., pp. 301–340, Optical Fiber Communication Conference, OFC, Jan. 1991, Tutorial Sessions.

Dawson, "AM Systems Bring Fiber to Cable Television", *Laser Focus World*, Feb. 1990, pp. 129–137.

Regener, "Pigtailed Integrated Optical Gyro-Circuits Meeting Military Requirements", *Integrated and Guided-Wave Optics*, vol. 4, Feb. 1989, pp. 106–109.

Kondo, "Lithium Niobate Integrated Optic Devices for Photonic Switching", Optic Fiber Communication OFC '90, Feb. 1989.

Thylen et al., "Beam Propagation Method Analysis of the Digital Switch", *Integrated and Guided-Wave Optics*, vol. 4:229–232, Feb. 1989.

Nightingale et al., "Low-Voltage, Polarization-Independent Optical Switch in Ti-Indiffused Lithium Niobate", *Integrated and Guided-Wave Optics*, vol. 4:10–13, Feb. 1989.

Thylen, "Optical Switch Arrays in LiNbO$_3$, Status Review and Prospects", *Integrated and Guided-Wave Optics*, vol. 4:2–5, Feb. 1989.

Veselka et al., "Integrated High-Speed Ti:LiNbO$_3$ $\Delta\infty$ Reversal Switching Circuits", *Integrated and Guided-Wave Optics*, vol. 5, Mar. 1988, pp. 357–360.

Stegeman et al., "Nonlinear Guided-Wave Device Characteristics", *Integrated and Guided-Wave Optics*, vol. 5, Mar. 1988, pp. 340–342.

Silberberg et al., "The Digital Optical Switch: Theory and Application", *Integrated and Guided-Wave Optics*, vol. 5, Mar. 1988, pp. 231–235.

Thaniyavarn et al., "Millimeter-wave Signal Generation and Control Using Optical Heterodyne Techniques and Electrooptic Devices", vol. 5, Mar. 1988, pp. 250–251.

Chandreskhar et al., "Integrated Balanced Mixer Circuite for Coherent Lightwave Receivers", *Integrated and Guided-Wave Optics*, vol. 4, Feb. 1989, pp. 186–189.

Kahn et al., "4 Gbit/s PSK Homodyne Transmission System Using Phase-Locked Semiconductor Lasers", *Optical Fiber Communication* OFC '90 San Francisco Post Deadline Papers, Jan. 1990.

Cheng et al., "Phase-noise Cancelling Heterodyne Receivers for Coherent Optical Communication Systems", *Optical Fiber Communication* OFC '90 Houston, Feb. 1989, TU17.

Mahaptra et al., "Design and Fabrication of Amplitude Modulator for CATV", OE/Fibers Conference, Sep. 1990, pp. 2–5.

Alferness, "Titanium-Diffused Lithium Niobate Waveguide Devices", *Guided-Wave Optoelectronics*, Chapter 4, Sep. 1990, pp. 145–209.

Optical Synchronous Detection with Coded Modulators Applied to Optical Frequency Domain Reflectometry, Nazarathy et al., Optical Fiber Communication OFC '89 OFC '89, Feb. 1989, THF3.

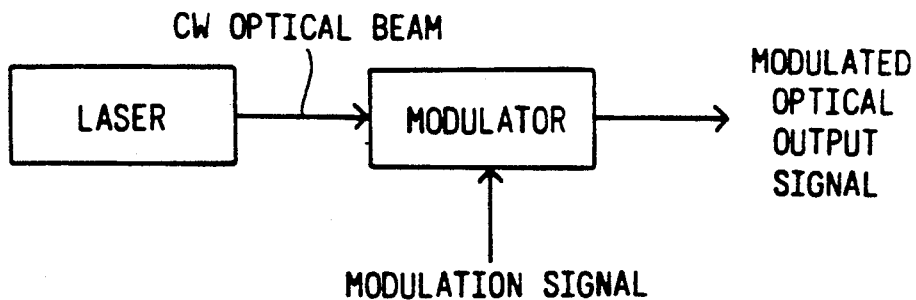
FIG. 1 (PRIOR ART)
FIG. 2 (PRIOR ART)
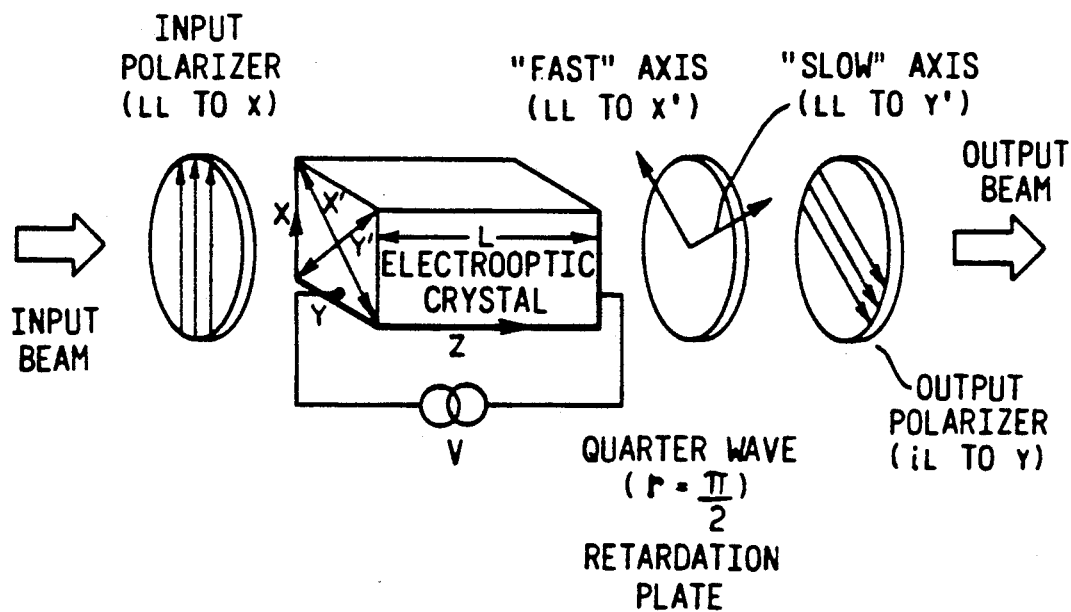
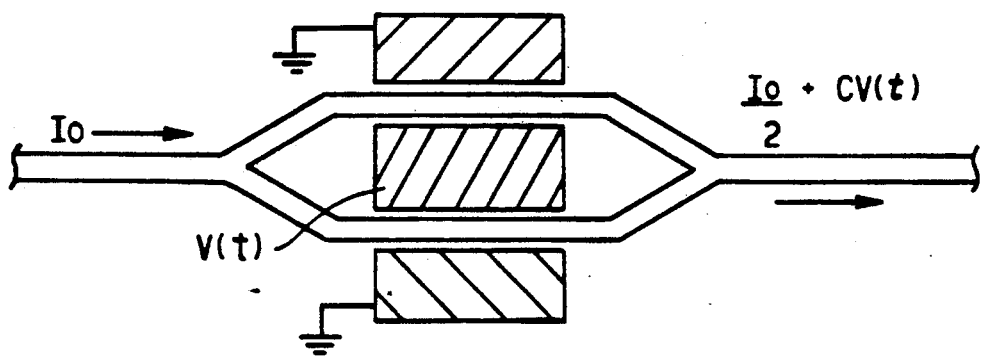
FIG. 3 (PRIOR ART)

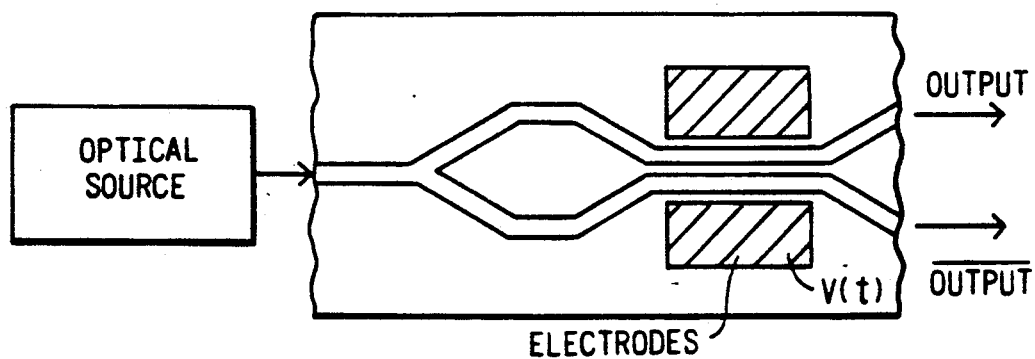
FIG. 7 (PRIOR ART)
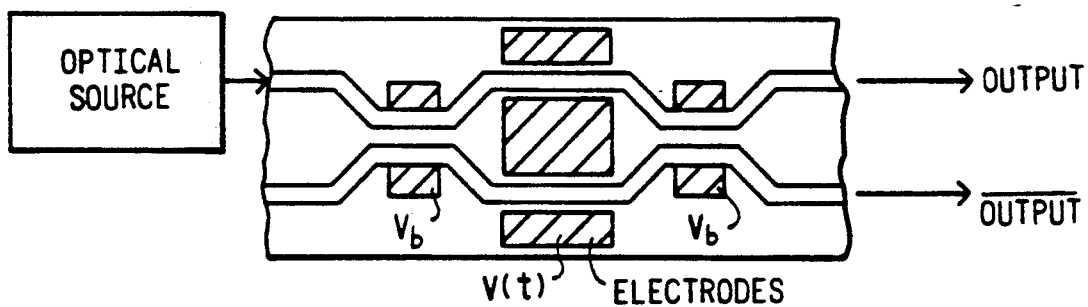
FIG. 8 (PRIOR ART)
FIG. 9
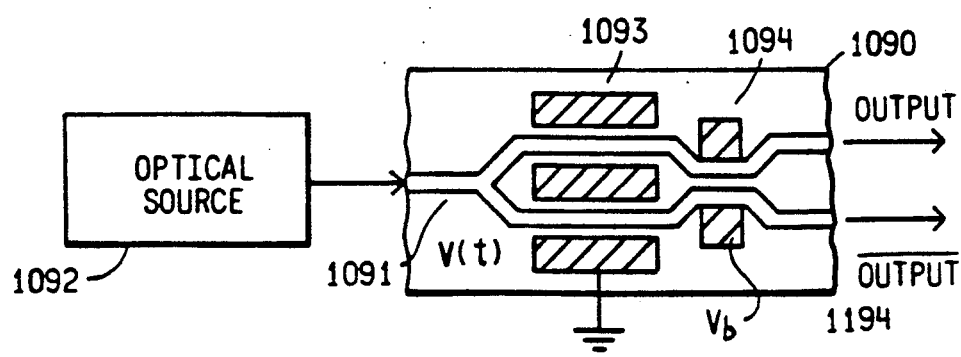

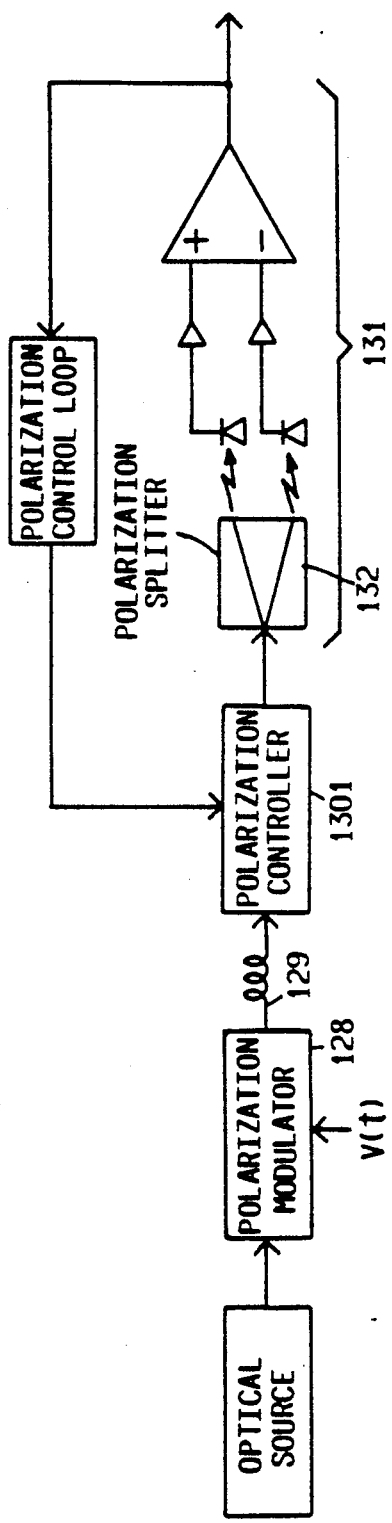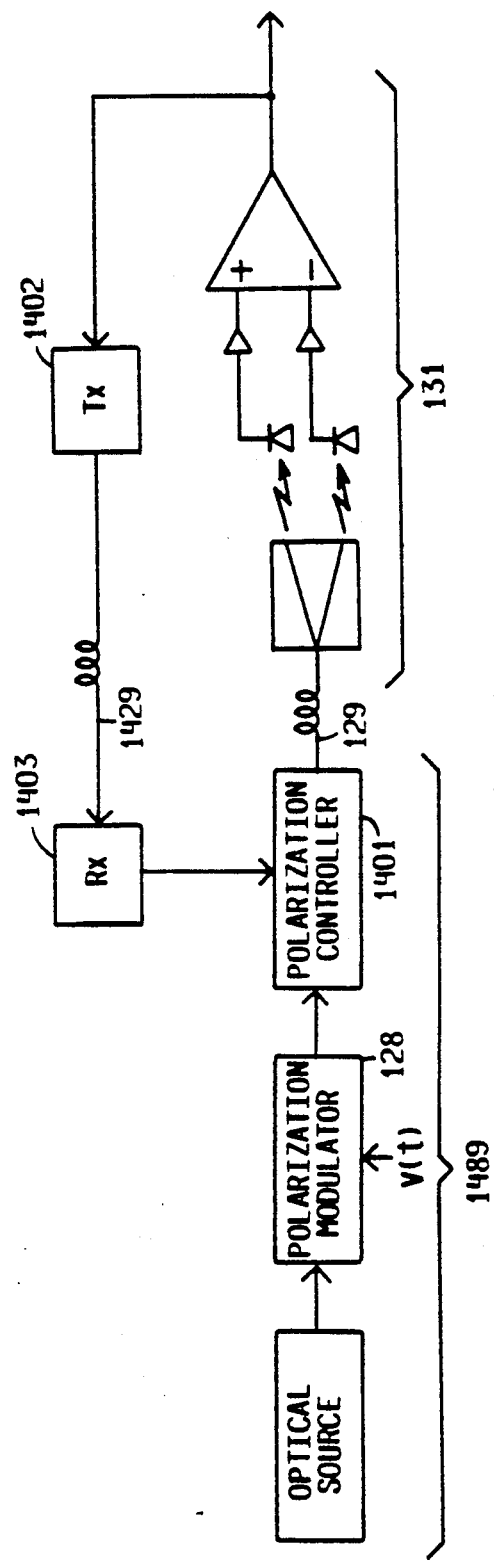

OPTICAL DISTRIBUTION OF ANALOG AND DIGITAL SIGNALS USING OPTICAL MODULATORS WITH COMPLEMENTARY OUTPUTS

INTRODUCTION

Although digital communication has been gaining in importance, analog signal transmission is still an important transmission method, particularly in regard to the distribution of video signals. The broadcast distribution of television signals and the distribution of television signals via cable are most obvious examples of analog communications. At the high bandwidths required for video signals, the attenuation of transmission lines such as coaxial cable and the bandwidth of repeater amplifiers are significant factors dictating the use of the transmission format which best preserves bandwidth, namely Amplitude Modulation (AM). In particular, AM-vestigial sideband (AM-VSB) modulation is used in television. The penalty to be paid for the reduced bandwidth of AM as compared to digital transmission is a higher signal to noise ratio required for AM transmission (about 30 dB more than for digital transmission).

In particular, fiber optical transmission has been considered for cable television (CATV) systems as a means to transmit AM/frequency division multiplexed (AM/FDM) signals over longer distances, without repeaters, as described by J. Koscinski, "Feasibility of Multichannel VSB/AM Transmission on Fiber Optic Links," NTCA Technical papers, Las Vegas 1987, p. 17. Such fiber optic AM links apply optical intensity modulation upon a light source, sending the modulated light signal via fiber to a receiver which converts the optical intensity signal back to an electrical signal. The modulating electrical signal is a composite signal with the AM video channels multiplexed in frequency, hence the term AM/FDM.

The useful length of a fiber optic analog link is determined by factors such as the optical power available, the relative intensity noise (RIN) of the optical source (which is typically a laser), and the sensitivity of the optical receiver. Also of importance is the non-linearity of the modulation characteristics of the optical source. Second order and third order distortion cause crosstalk, intermodulation distortion, and interference among the transmitted channels.

With present technology, the limiting factors for optical AM links used for cable television transmission are the RIN of the laser source and the second order distortion resulting from the light-current modulation characteristics.

External modulation of the light source has been proposed and demonstrated for analog transmission via fiber, as described by W. E. Stephens and to. R. Joseph, "System Characteristics of Direct Modulated and Externally Modulated RF Fiber-Optic Links", Journal Lightwave Technol., Vol. LT-5, pp. 180–387, 1987. When using an externally modulated light source, as shown in FIG. 1, the laser is run in the continuous wave (CW) mode, i.e. at constant output power into an optical modulator, which also has an electrical input port. The resulting optical output signal from the optical modulator is a modulated light beam, with an optical intensity envelope that is a replica of the modulating electrical signal.

Typical prior art electro-optic amplitude modulators are described by Amnon Yariv and Pochi Yeh, "Optical Waves in Crystals", Ch. 7: Electro-optics, Ch 11: Guided waves and integrated optics), Wiley, 1984: R. Alferness, "Titanium Diffused Lithium Niobate Waveguide Devices", in "Guided-Wave Optoelectronics", to. Tamir ed., Springer-Verlag, 1988. Such a typical prior art amplitude modulator may be structured as either a phase modulator between crossed polarizers (FIG. 2), or an interferometric device superposing the outputs of two phase modulators (FIG. 3), i.e. a Mach-Zehnder interferometer. In turn, an electro-optic phase modulator is constructed by passing the optical beam through a material which is electro-optic, i.e. when an electric field is applied to it, the refractive index of the material and thus the speed of light and the time of flight delay, changes linearly with the applied voltage.

Of particular interest are integrated-optic modulators, where the electro-optic interactions occur in optical waveguides that are patterned into optical substrates via microlithographic techniques. Such integrated-optic devices tend to require lower drive voltages than bulk modulators, since the small dimensions of the optical guides are such that the electric fields across the optical guides are very intense.

Another type of modulation acts upon the state of polarization of the light beam, rather than its intensity, as shown in FIG. 4. Polarization modulation is achieved not by phase modulation, but by conversion between two orthogonal propagation modes of an integrated optical waveguide, i.e. TE-TM mode conversion, as described by R. Alferness, "Titanium Diffused Lithium Niobate Waveguide Devices", in "Guided-Wave Optoelectronics", to. Tamir ed., Springer-Verlag, 1988. One example of such a polarization modulator is shown in FIG. 4. Polarization modulator 400 includes optical waveguide 401, and electrode 404 placed in close proximty. Located on the opposite side of waveguide 401 is electrode 402, which receives a voltage $V_1$ which serves to phase shift the optical beam propagating within optical waveguide 401. Electrode 403 is located out-of-plane to electrode 404, and receives a voltage $V_2$ which serves to cause mode conversion of the optical beam propagating within waveguide 401. Such modulators have been used to modify an arbitrary state of polarization of an input light beam into a linearly polarized output beam. Such devices, when operated at low modulation rates, are called polarization controllers.

The advantage of externally modulating a laser as opposed to directly modulating the drive current of the laser is that the so called chirp effect—a parasitic FM modulation created when modulating the laser current—is avoided. Also, more significant for AM fiber optic transmission, the intensity noise of lasers which are run CW at constant power tends to be lower than that of lasers under broadband modulation.

The main disadvantage of external modulation is the need for a second optical device-the additional modulator, with increased cost, complexity, and insertion loss through the modulator. A large fraction of this loss is inherent or intrinsic in the physics of a modulator, which dictate a voltage-light characteristic that is typically a raised cosine curve, as shown in FIG. 5. The maximum points A of the curve correspond to maximum transmission (on-state) of the device, where ideally or intrinsically in the absence of excess losses (absorbtion of light in the guiding material) the transmission is 100%. The minimum points B represent the off-state of the device, where ideally all the light is blocked from reaching the output. For analog transmission, the device is biased at the 50% transmission point Q, the so called quadrature point. At the quadrature bias point Q, half the light is dissipated in the device, however, at this point the linearity is the best, i.e. modulation signal voltage deviations from this state translate into proportional intensity deviations with only slight distortion, caused by the deviation of the sine curve from a straight line.

Analog AM transmission systems and distribution networks benefit from fiber-optic transport, since the distance between electrical repeaters is greatly increased. However, the requirements on RIN and on second-order linearity are very stringent for directly modulated lasers to be used in the optical transmitters. An alternative to using directly modulated lasers is using external modulators.

Unfortunately, a major disadvantage of using external modulators is the intrinsic 50% loss upon biasing at the quadrature point of linear operation. Furthermore, it is important to find ways of further reducing the intensity noise, since this would result in improvement of link performance.

Furthermore, in the tree-and-branch architecture used by the cable industry for video distribution, which is described by K. to. Deschler, "Cable Television Technology", McGraw Hill, 1986, one would typically like to distribute many optical fibers from the headend of a cable network, so it is advantageous to find methods of reducing the number of transmitters used to modulate the video signals onto the outgoing multiple fibers.

The advantage of using external modulators vs. directly modulated lasers in terms of the non-linear intermodulation distortion have been discussed by G. E. Bodeep and to. E. Darcie, "Comparison of Second and Third Order Distortion in Intensity Modulated InGaAsP Lasers and an LiNbO$_3$ External Modulator", Paper WK2, OFC89' Conference on Optical Fiber Communications, Houston, Tex., February 1989, where it was concluded that external modulators tend to have lower second order distortion but higher third order distortion than directly modulated lasers. However, the ability to keep down the second order distortion of an external modulator depends on how close to the quadrature point the device is biased. Various fabrication imperfections, temperature changes, optical damage, etc. cause the bias point to drift away from the quadrature point, in which case the second order distortion may become substantial.

A recent experimental demonstration of AM fiber transmission utilizing an external Mach-Zehnder modulator, and a high power low RIN 1.3 µm solid state Nd:YAG laser pumped by a high power GaAlAs/GaAs laser diode array, is described by G. E. Betts, L. M. Johnson, C. H. Cox III, S. E. Lowney, TuJ19, "High Sensitivity optical analog link using an external modulator", CLEO '89 Apr. 24-28, Baltimore, Md.

BRIEF DESCRIPTION OF THE DRAWING

FIG. 1 depicts a typical prior art system including a laser and an external modulator;

FIG. 2 is an example of a prior art amplitude modulator utilizing a phase modulator located between cross polarizers;

FIG. 3 is an example of a typical prior art Mach-Zehnder interferometer;

FIG. 7 depicts a typical prior art Y-said directional couplers;

FIG. 8 depicts a typical balanced-bridge interferometer of a prior art;

FIG. 9 depicts another complementary output optical modulator;

FIG. 12b depicts the polarization state of the structure of FIG. 12a;

FIG. 13 depicts an alternative embodiment as the structure of FIG. 12a which includes a polarization controller for insuring the polarization states are correct;

FIG. 14 is yet another embodiment of an optical system constructed in accordance with the teachings of this invention including a polarization control loop fed back from the receiving end of an optical link to the transmitter end of the optical link;

SUMMARY

Figure 4:
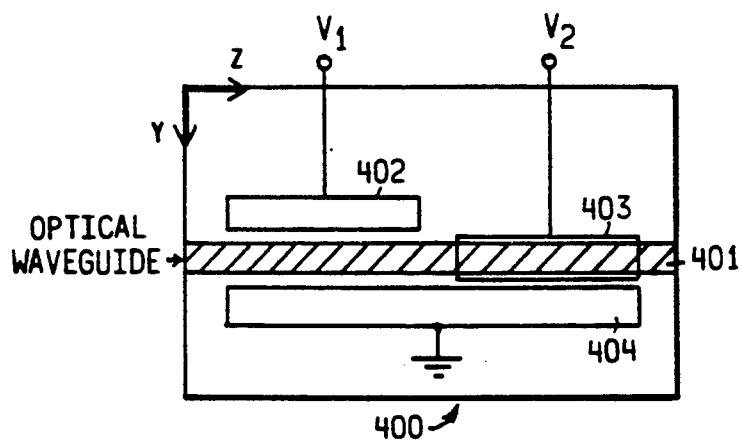
FIG. 4 depicts a typical prior art polarization modulator.
Figure 5:
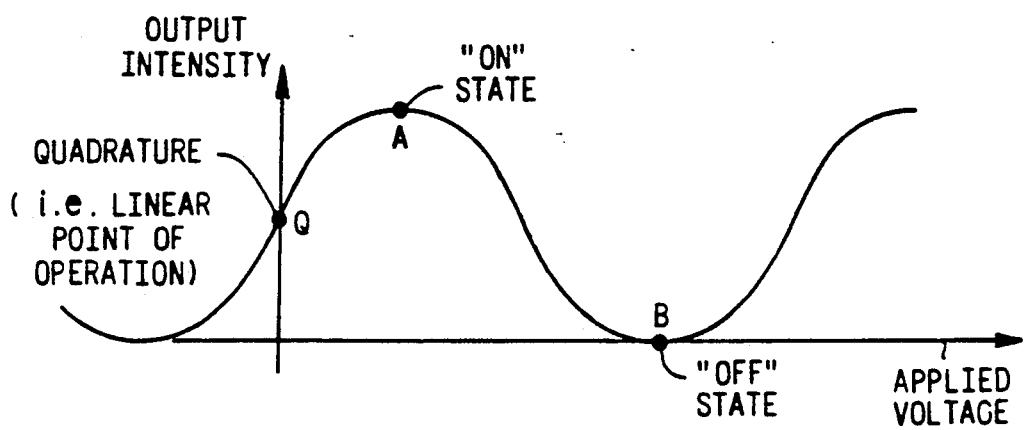
FIG. 5 is a graph depicting a raised cosine transfer characteristic and the quadrature point of linear operation or an external modulator.

In accordance with the teachings of this invention, a novel optical system suitable for the transmission of analog and/or digital signals is taught including an optical source, an optical modulator having at least one optical input port for receiving the optical signal from the optical source, a modulation port for receiving a modulating signal, and complementary output ports. The complementary modulated output signals are applied to one or more optical receivers at the other end of an optical transmission link. In one embodiment of this invention, the two complementary signals are provided to two separate optical receivers, thereby allowing distribution of optically modulated signals, for example, in a cable television or other type distribution system. In another embodiment of this invention, the two complementary modulated signals are applied to a balanced receiver, thereby providing information content to the complementary receiver at twice the power level available on either one channel alone. Furthermore, utilizing a balanced receiver, common mode error signals cancel, thereby increasing the signal to noise ratio of the system.

In one embodiment of this invention, a single optical transmission channel is used, and the two optically modulated signals are separated in polarization so as to be capable of being separately detected on the receiving end of the link. In one embodiment of this invention, feedback means is used to insure proper polarization states between the two complementary signals.

DETAILED DESCRIPTION

This specification discloses the application of integrated-optic devices, and the exploitation of the peculiar tree-and-branch architecture of video distribution, to effectively eliminate the intrinsic waste of 50% of optical power in external optical modulators that are biased in their linear region of operation. This specification also discloses a new architecture to reduce intensity noise, and to reduce the even orders of modulating signal distortion for imperfectly biased modulating devices.

Complementary Output Modulation

In prior art external modulation techniques for fiber-optic AM transmission, half the optical power is dissipated in the external modulating device because of the need to bias the modulator in quadrature, half-way between its on and off states, in order to attain the maximum degree of linearity.

One major advantage of this invention is the ability to utilize substantially all the optical power, including the 50% which is wasted in prior art modulators. The power previously wasted in prior art modulators is utilized in accordance with the teachings of this invention to accomplish transmission to either a different receiver, as required in situations involving distribution of signals to multiple points as in cable television, for example, or to the same receiver, in which case a novel signal processing technique is used to recombine the two signals. When the previously wasted power is routed to the same receiver, an important benefit results: partial cancellation of RIN and even orders of distortion.

Complementary Output Devices

In accordance with the teachings of this invention, modulators with pairs of complementary outputs are used, such that optical energy is not wasted but is rather transferred from one output to the other in accordance with the modulating signal. Unlike prior art integrated optic modulators having multiple ouput ports, in accordance with the teachings of this invention, such an optical modulator having multiple ouput ports is used to provide multiple output signals which are simultaneously routed to a plurality of optical receivers (FIG. 15c), or simultaneously routed to complementary input ports of a single optical receiver (FIG. 15d). One embodiment of a complementary output modulator constructed in accordance with the teachings of this invention uses a directional coupler which couples light energy from one waveguide to the other in response to the modulating signal.

In a single output modulator, half the optical power is dissipated in the device, on the average. The modulated optical signal rides on a bias CW component. When the modulating signal goes positive, the optical power rises with respect to the 50% bias level, and vice versa.

In a directional coupler or other modulating means with dual complementary outputs, whenever the light energy signal in one output is suppressed to less than its bias level, it reappears in the other arm as an equal signal above its bias level. Thus, the sum of the two output powers is constant with only constant absorbtion loss.

Figure 6:
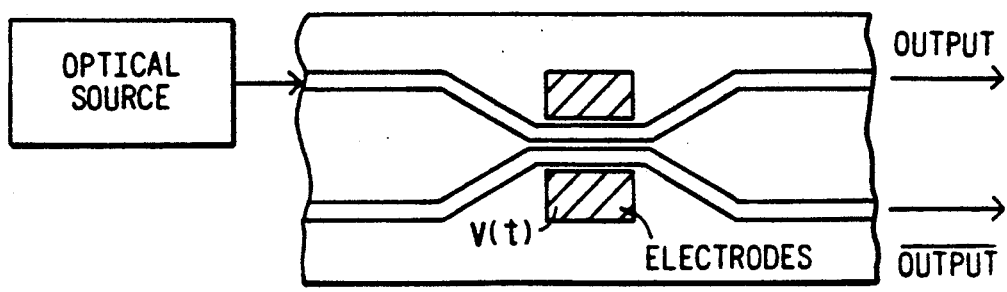
FIG. 6 depicts a typical prior art directional coupler.

Complementary modulation means suitable for use in accordance with the teachings of this invention include those described by R. Alferness, "Titanium Diffused Lithium Niobate Waveguide Devices", in "Guided-Wave Optoelectronics", to. Tamir ed., Springer-Verlag, 1988, and include:

a directional coupler (FIG. 6), including electrodes for receiving signals for modulation, a Y-fed directional coupler (FIG. 7), including electrodes for receiving a modulating signal; and the balanced-bridge interferometer (also known as a 2×2 switch): a device which consists of two directional couplers with a two-arm interferometer in between (FIG. 8).

An additional complementary modulation means is shown in FIG. 9, consisting of integrated optic device 1090 including Y-junction 1091 which receives light from optical source 1092. Y-junction 1091 feeds two-arm phase-shifting interferometer 1093, which in turn feeds directional coupler 1094. The input signal is split into two equal components. Each propagates over one arm of interferometer 1093. The interferometer arms are sufficiently separated to prohibit evanescent coupling between them. The two interferometer arms are connected to the two input ports of directional coupler 1094. The coupler may be equipped with control electrodes 1194 to adjust the splitting ratio as desired, for example to 50/50. A similar device has been used in another context as a one-by-two switch, having one input port and two complementary output ports.

Figure 10:
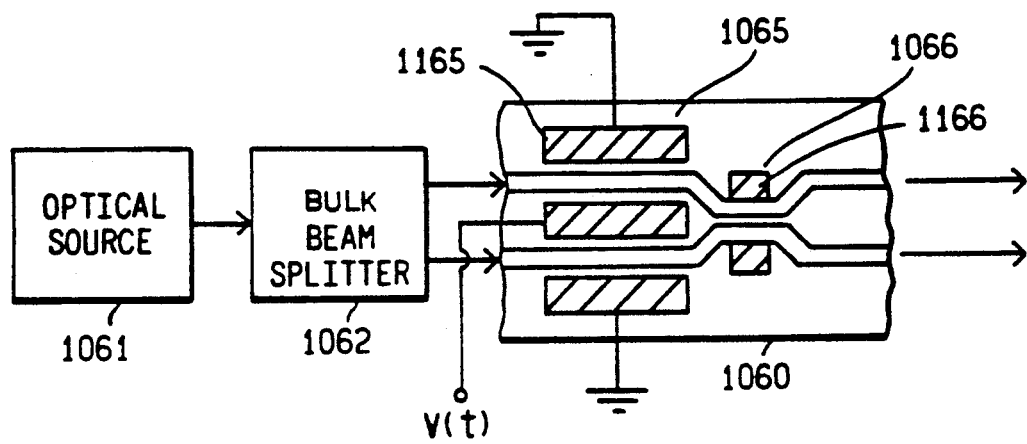
FIG. 10 depicts yet another optical complementary output modulator.

Yet another complementary modulation means, shown in FIG. 10, consists of an integrated optic device 1060 comprising two-arm phase-shifting interferometer 1065 with arms sufficiently separated to prevent coupling therebetween followed by directional coupler 1066. External bulk-optic beam-splitter is used to inject light from optical source 1061 into the two input ports of two-arm interferometer 1065, thus performing off-chip the 50/50 splitting task.

Of importance, in all these embodiments the integrated optic couplers are used not in the conventional way as digital switches which serve to direct all light energy from one port to the other. Rather, the couplers are used in this invention in a novel manner to provide two complementary output signals for the purposes of analog modulation.

In particular, incorporating directional coupler type devices rather than interferometric modulators in the transmitter makes efficient use of the available power, by serving additional receivers in the broadcast distribution networks with power than was previously wasted in the substrates of prior art modulator devices.

Preferably, a CW laser source of high power and low RIN is used in conjunction with the integrated optic complementary means of modulation. One suitable source is a solid state diode pumped laser such as a Nd:YAG laser providing an output at approximately 1.3 μm wavelength, and pumped by a laser diode array. Another optical source suitable for this application is a distributed feedback laser (DFB) or an external cavity laser operating at either approximately 1.3 μm or approximately 1.5 μm wavelength, or an Er:YAG or Er doped glass laser operating at approximately 1.5 μm wavelength.

In one embodiment of this invention, an optical source and a complementary output modulator are both formed as a single integrated optic device, such as a InGaAsP/InP semiconductor laser monolithically integrated with a complementary output modulator. Alternatively, GaAs/GaAlAs can be used to form such a monolithic device.

A Single Balanced Optical Receiver

Figure 11:
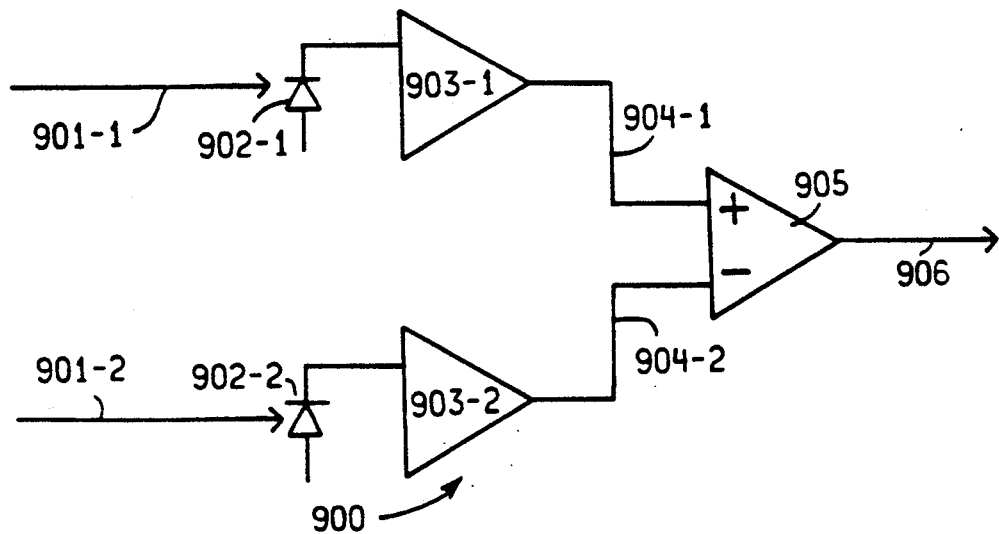
FIG. 11 depicts a balanced optical receiver constructed in accordance with the teachings of this invention.

In one embodiment of this invention, as shown in FIG. 11, the two complementary outputs which carry modulation signals of opposite polarities are routed to the same optical receiver 900 rather than to two separate optical receivers. In one such embodiment, the receiver is a balanced receiver which uses two photodetectors 902-1;902-2 in order to detect the signals on the two complementary channels 901-1;901-2. The signal processing scheme required to combine the two signals consists of electronic subtraction of the two channels, for example, by means of differential amplifier 905. Since the modulated optical signals in channels 901-1 and 901-2 are derived with opposite polarities from the same electrical modulating input signal, this subtraction results in reinforcing the resultant signal to double the value of the modulation signals in each channel.

In addition to making use of power previously wasted in the integrated-optic device substrate of prior art devices, the advantage of this embodiment is substantial in terms of the reduction in spurious signals due to RIN. Since the two outputs of the modulating device are derived from the same optical laser source, the laser intensity excess fluctuations are common to the two signal paths, i.e. they appear with equal amplitudes and the same polarity. Subtraction of the two photodetected signals cancels these common-mode signals.

Balancing of Gains and Matching of Delays

One requirement for the successful operation of the embodiment of FIG. 11 is that the two channels be balanced in gain and matched in delay, i.e. the complementary optical modulation signals which are presumably generated with opposite polarity and with equal amplitude at the transmitter maintain opposite polarity and equal amplitude at the receiver, whereas the common mode signals which are common to the two paths will arrive in phase at the receiver and therefore perfectly cancel. For this purpose, the gains in the two paths should be equal (or if the signals are launched with unequal amplitudes, the ratio of the gains should be equal to the inverse ratio of launch amplitudes) and the two optical paths should be equal in delay, such that the 180 degree phase relationship between the signals at the transmitter is maintained at the receiver.

In practice, the delay difference between the two arms should not exceed a small fraction of the RF wavelength corresponding to the highest frequency being transmitted, a condition that could be attained if the two fibers are strung in the fiber optic cable such that they stay in tight proximity (e.g. fibers from the same tube are chosen).

One way of adjusting the gain difference in the two arms for perfect cancellation of the noise and the even orders of harmonic distortion is to monitor the generation of the second-harmonic of a pilot tone signal at the output of the differential amplifier which subtracts the two channels.

Upon perfect balancing of the two paths this second-harmonic signal should disappear. In one embodiment, an automatic gain control signal is used for making the gain in the two channels equal, by monitoring the generation of the second harmonic signal.

In one embodiment, an electrical delay line is used to match the delay between the two paths, but in a preferred embodiment equalization is performed in the optical domain, by trimming the fiber lengths. Test equipment methods such as the use of OTDR (Optical Time Domain Reflectometry) and OFDR (Optical Frequency Domain Reflectometry) with high resolution are suitable for use in adjusting the two fibers to equal length.

Polarization Multiplexing of Complementary Channels

Figure 12A:
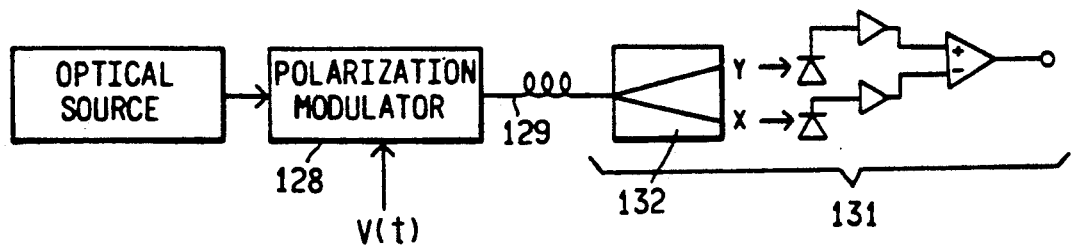
FIG. 12a depicts an optical system constructed in accordance with the teachings of this invention which utilizes a polarization modulator to complementary optical signals to be transmitted in different polarizations on a single optical path.
Figure 12B:
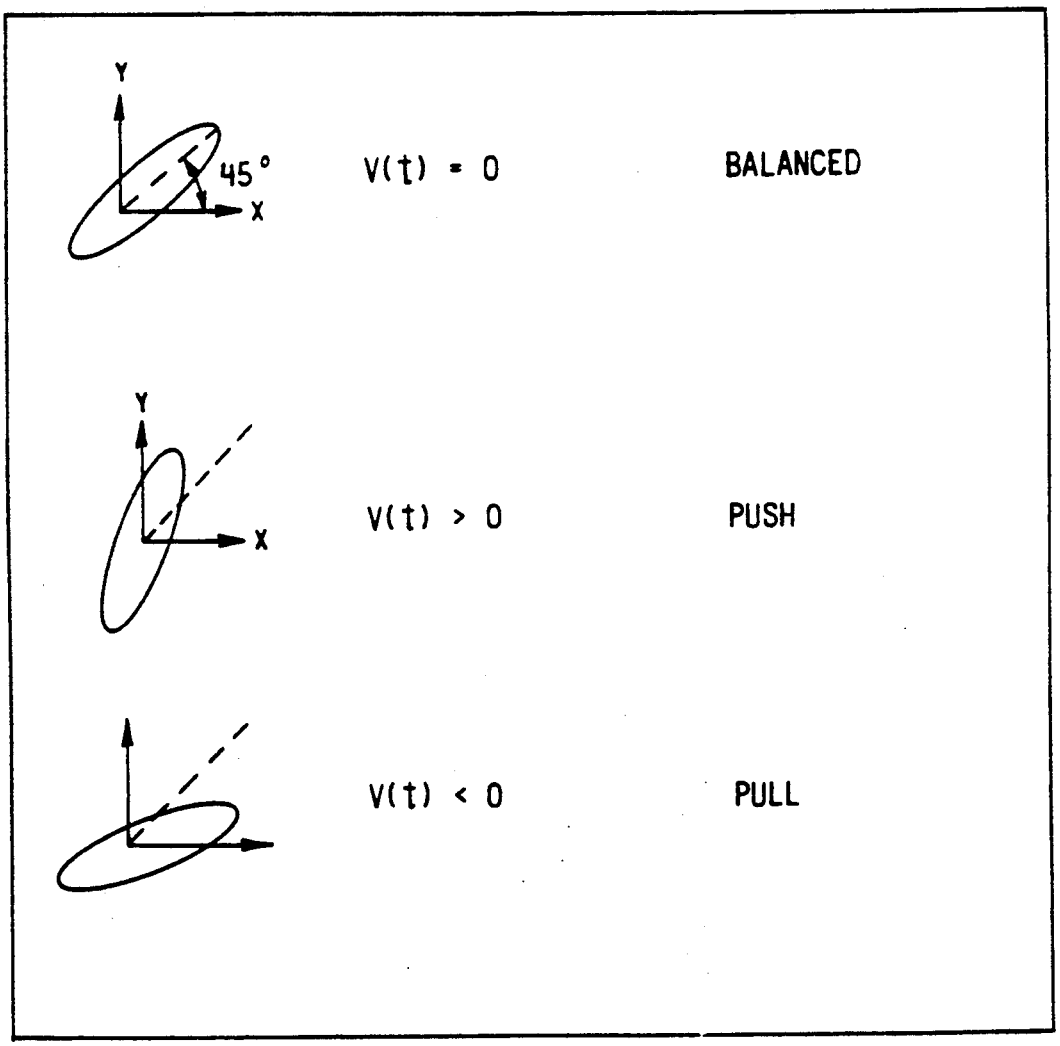

In another embodiment of this invention (FIG. 12a), the two complementary channels are multiplexed in polarization by polarization modulator 128, and transmitted over a single fiber 129, separated by polarization splitter 132, and the two complementary channels applied to balanced receiver 131. This is achieved by identifying each complementary channel with one of two orthogonal linear states of polarization in the fiber and modulating the polarization of the two states in a complementary fashion such that when the amplitude of one polarization increases, the amplitude of the other polarization decreases. For linear states of polarization, this corresponds to rotating the plane of polarization of the signal. For the generic elliptic polarization state, the push-pull complementary operation corresponds to changing the tilt of the polarization ellipse (this change of tilt may or may not be accompanied by a change of ellipticity, as depicted in FIG. 12b. At the receiver end, a means of demultiplexing the two polarizations is required. This means is provided by a polarization diversity receiver which separates the incoming optical signal into two orthogonal polarizations, and detects each polarization separately in a photo-detector. The outputs of the two photodetectors are then signal processed by subtraction as in the previous embodiment. This subtraction of the two polarization powers results in reinforcing the two useful transmitted signals, since the modulation signal affects the two polarizations with opposite polarities. Thus, subtracting two equal quantities with opposite polarities, results in doubling each of the original quantities.

One advantage of the embodiment of FIG. 12 is that the relative delay between the two polarization channels is assured to be maintained with good accuracy, since the two polarizations propagating in the same fiber see essentially the same optical path.

Polarization Control

A polarization modulator should be used to rotate the state of polarization of the launched light around the 45 degree position of the bias state. Maintaining balanced gains in this embodiment is more difficult. If polarization maintaining fiber is used, the state of polarization as launched at the transmitter will tend to be maintained at the receiver. With polarization maintaining fiber, the two principal axes of the fiber are preferably aligned with the axes of the polarization diversity receiver, and the bias state of polarization at the transmitter, at the output of the polarization modulator, is preferably at 45 degrees with respect to the axes of the fiber.

If regular fiber is used, the problem is encountered that polarization fluctuations may occur, wherein a given state of polarization launched at the transmitter evolves along the fiber due to residual birefringence of the regular fiber, into a different state of polarization at the receiver. A means is needed to actively modify the bias state of polarization (i.e. the DC component of the state of polarization) at the output of the transmission fiber such as it is oriented at 45 degrees with respect to the polarization detection axes of the polarization diversity receiver.

In the embodiment of FIG. 13, polarization controller 1301 is installed in the receiver, ahead of the polarization diversity receiver 131, to achieve this effect. Again the generation of a second harmonic signal would accompany a non-balanced state, wherein the modulated energies in the two polarizations are unequal. In one embodiment, this signal is used to feed back to polarization controller 1301, so as to bring the two polarizations into balance.

Polarization Controller in the Transmitter

Another embodiment, particularly well suited for cable television distribution signals, includes a polarization controller in the transmitter rather than in the receiver (FIG. 14). The particular utility of this embodiment with respect to cable television distribution has to do with the harsh environmental conditions that receivers are exposed to, whereas transmitters reside in a temperature-conditioned head-end. Another advantage of this invention is that the polarization controller may be integrated on the same integrated-optic chip as the polarization modulator in the transmitter.

In this embodiment, the control signals required to actuate polarization controller 1401 are transmitted from receiver 131 back to the transmitter. Fiber 129 itself could be used as a communication channel to achieve this telemetric transmission and close the polarization control loop. Alternatively, as shown in FIG. 14, an additional fiber link 1429 is used to feed back signals from receiver 131 to polarization controller 1401 located in transmitter 1489. In any event, feedback loop transmitter 1402 and feedback loop receiver 1403 are used to interface to the optical path used. The bandwidth of the system will be limited by the delay in the communication loop but, fortunately, the rate of change of polarization in regular single mode fiber is generally slow.

In one embodiment, the functions of polarization controller and polarization modulator are combined in the same integrated optics device consisting of a tandem combination of phase modulator and a TE-TM mode converter. Furthermore, in one embodiment a single electro-optic waveguide is used to carry superposed control fields from two different sets of electrodes in order to integrate the two functions of polarization control and polarization modulation.

Comparison with Prior Art

The following table shows a comparison in output power for a variety of prior art devices, as compared with a device constructed in accordance with the teachings of this invention. Assuming an optical source is used which is capable of producing peak output power of $P_{peak}$, and the modulation is a sine wave, a directly modulated laser would provide an output beam having peak power $P_{peak}$ and thus average optical power $(0.5)$ $P_{peak}$. As shown, a device constructed in accordance with the teachings of this invention provides two output signals, each at $-3$ dB from the CW optical source power level of $P_{peak}$, with only approximately 2 dB loss. Thus the total output power of the device of this invention allows a total average power level of only $-2$ dB from the optical source, a significant improvement over the prior art.

TABLE

Figure 15A:
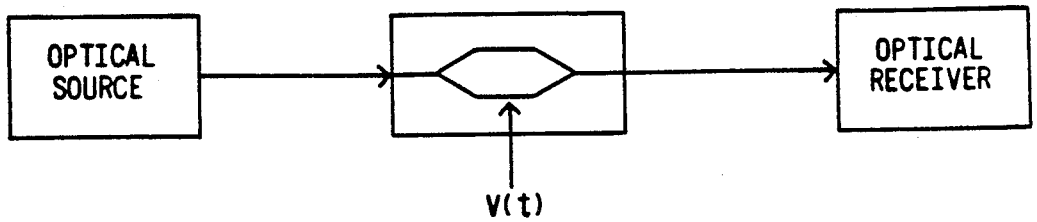
FIGS. 15a-15d depict a comparison between the use of prior art external modulators and the use of external modulators in accordance with the teachings of this invention.
Figure 15B:
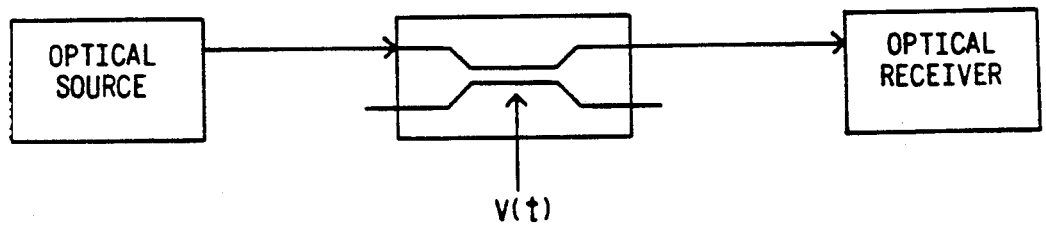
Figure 15C:
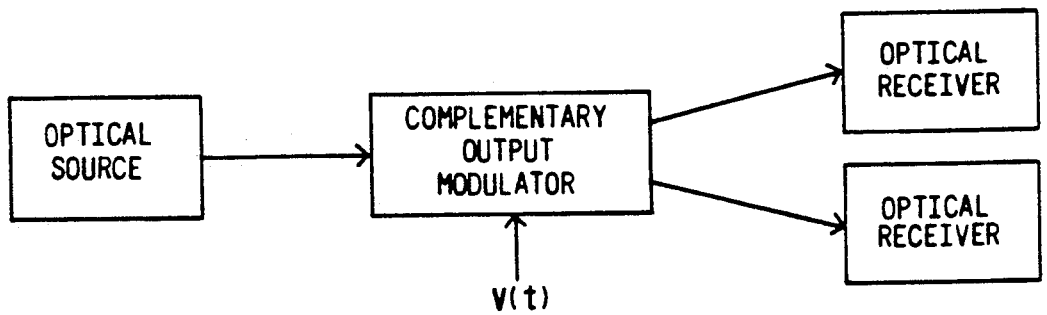
Figure 15D:
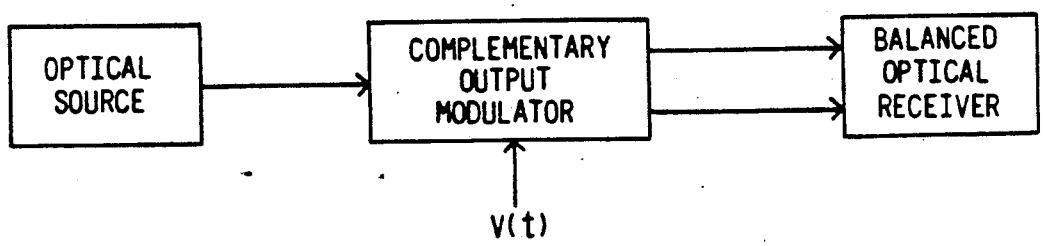

| Device | Output Power When Modulated by a Sinewave | Intrinsic Loss | Total Loss |
|---|---|---|---|
| Directly modulated laser | one output port @ $(0.5)$ $P_{peak}$ ($-3$ db) | 0 | 3 db |
| Mach-Zehnder | one output port @ $(0.5)$ $P_{peak}$ ($-3$ db) | 2 db | 5 db |
| Directly modulated laser coupled to a Y-splitter | two output ports each @ one-half $(0.5)$ $P_{peak}$ ($-6$ db) | 0.1 db | 3.1 db |
| Mach-Zehnder Modulator coupled to a Y-splitter | two output ports, each @ one-half $(0.5)$ $P_{peak}$ ($-6$ db) | 2 db | 5 db |
| One embodiment of FIG. 15c | two output ports, each @ $(0.5)$ $P_{peak}$ ($-3$ db) | $\leqq 2$ db | $\leqq 2$ db |

An additional comparison of Mach-Zehnder external modulation vs. complementary output modulation vs. direct laser modulation is now described with reference to FIGS. 16a-16c. All three compared systems serve four receivers. Any number of multiple receivers can be served in such a fiber optic distribution system by repeatedly splitting the outputs using fiber optic splitters or couplers. For comparing these systems of FIGS. 16a-16c, assume that three laser sources 161 provide peak optical power P, and that the intrinsic losses of the modulators are represented by a fraction (1/L). Ignoring the attenuation in the optical channels (e.g. fibers), which are assumed equal in the three cases, and neglecting the small losses in the fiber-optic couplers, and assuming a sinusoidal modulating signal which causes the source (either the laser or the modulator) to make an excursion (1/M) of the full on-off optical power range, the amplitude at the sinusoidal intensity modulation received by each receiver in the three cases is given as follows:

Mach-Zehnder Modulator

Figure 16A:
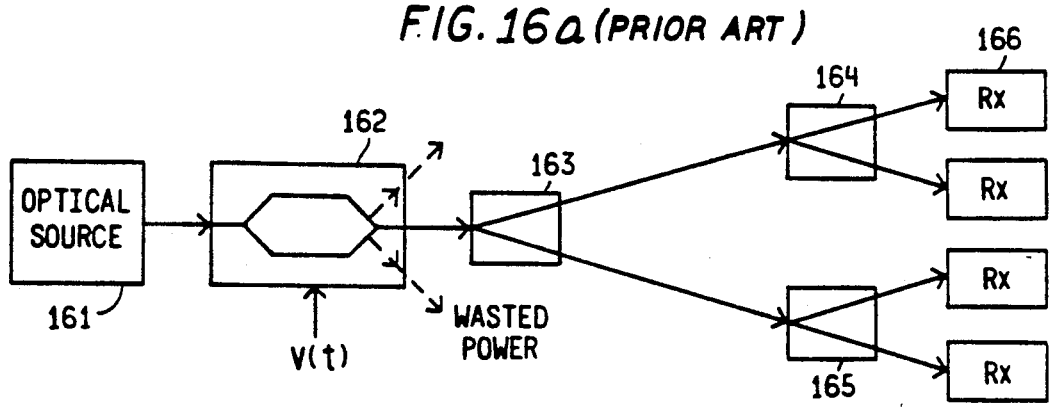
FIGS. 16a-16c depicts a comparison of power delivered to a plurality of receivers, using prior art techniques and in accordance with the teachings of this invention.

The prior art Mach-Zehnder modulator system of FIG. 16a provides a total optical power applied to the four receivers 166 to be equal to P/(8LM). The factor of 8 is composed of three factors of 2, two caused by couplers 163, 164, and 165, and one caused by the intrinsic loss of Mach-Zehnder modulator 162.

Complementary Output Modulator

Figure 16B:
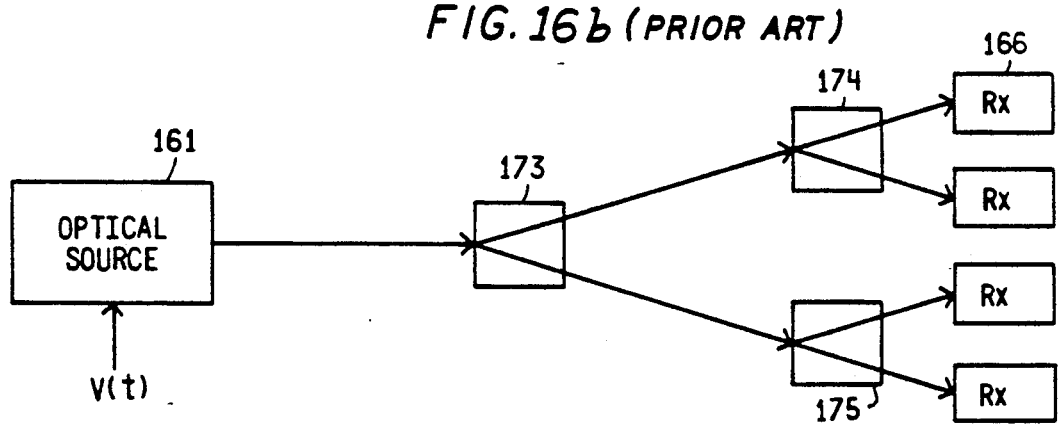
Figure 16C:
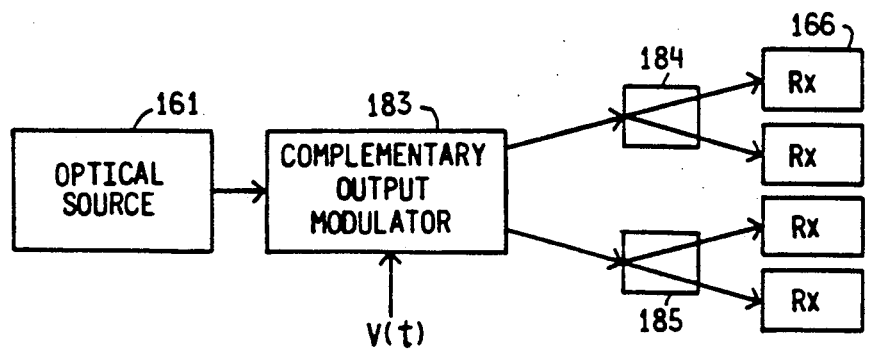

The embodiment of a complementary output modulator system constructed in accordance with the teachings of this invention shown in FIG. 16c provides a total optical power applied to the four receivers 166 to be equal to P/(4LM). The factor of 4 is composed of two factors of two, one caused by splitters 184 and 185, and the other caused by the fact that the optical power is used by complementary output modulator 183 to provide two complementary output signals.

Directly Modulated Laser (P/8M)

The prior art directly modulated laser system of FIG. 16b provides a total optical power applied to the four receivers 166 to be equal to P/(8LM). The factor of eight is composed of three factors of two: one factor of two because the average power is half the peak power P of optical source 161, and two factors of two caused by couplers 173, 174, and 175. In this case, the modulation losses (1/L) are avoided, however, a power output is reduced by a factor of 2 as compared to the complementary output modulator system of FIG. 16c. This is due to the fact that when the modulating signal goes fully negative, the output power of optical source 161 reaches a minimum, whereas complementary output modulator 183 of the system of FIG. 16c applies the energy extracted from the first arm when the power ouput of the first arm is decreased, and applies this power to the second arm to cause the second output signal to reach maximum power.

As has now been explained, the complementary output modulation technique of this invention is twice as efficient in optical power than the prior art Mach-Zehnder systems, and more efficient by a factor of 2/L prior art systems which use a directly modulated laser. A typical value of L is 1.5, so the present invention is more efficient than a system using a directly modulated optical source in terms of delivered power, namely by a factor of 1.33. Of course, additional advantages of external modulation are the reduced RIN of the unmodulated optical source and the ability to obtain significantly less second order harmonic distortion and intermodulation and well characterized third order harmonic distortion and intermodulation.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An optical transmission or distribution system comprising:
    a transmitter comprising:
        an optical source; and
        an optical modulating means having at least one optical input port coupled to said optical source, a modulation port for receiving a modulating signal carrying information to be distributed within said system, and complementary output ports for providing complementary modulated optical output signals in response to said modulating signal,
            wherein said optical modulating means, in response to said modulating signal, extracts power from one of said optical output signals and applies the extracted power to the other optical output signal, on an instantaneous basis, thereby maintaining the sum of the power contained in said complementary output signals substantially constant;
    one or more optical receivers located at a distance from said transmitter, wherein each of said receivers includes means for extracting said information from one of said output signals; and
    at least two optical transmission channels comprising one or more optical fibers serving to couple each of said complementary optical output ports of said optical transmitter to associated ones of said one or more optical receivers so as to provide at least one of said output signals to each of said receivers.

2. An optical system as in claim 1 wherein substantially the entire power from said optical source, less intrinsic losses, is available in said complementary optical output signals.

3. A system as in claim 1 wherein the said optical modulating means comprises an electro-optical modulator, and said modulating signal comprises an electrical signal.

4. A system as in claim 3 wherein said electro-optical modulator comprises an integrated-optical device.

5. A system as in claim 4 wherein said integrated optical device is an optical directional coupler.

6. A system as in claim 5 wherein said integrated-optical modulating means comprises a directional-coupler comprising:
    at least two input ports;
    at least two output ports;
    optical channels coupling each said input port to an associated one of said output ports;
    two or more electrodes in proximity to the optical channels; and
    means for applying said modulating signal to said electrodes in order to modulate the light in said optical channels.

7. A system as in claim 3 wherein said electro-optical modulator comprises an integrated-optic balanced bridge interferometer.

8. A system as in claim 7 wherein said integrated-optical balanced-bridge interferometer comprises:
    an integrated optic splitter having an input port and a first and a second output port;
    a two-arm interferometer having a first input port connected to said first output port of said first directional-coupler, a second input port connected to said second output port of said first directional-coupler, and a first and a second output port; and
    a directional coupler having a first input port connected to said first output port of said two-arm interferometer, a second input port connected to said second output port of said two-arm interferometer, and at least two output ports.

9. A system as in claim 8 wherein said two-arm interferometer further comprises a first waveguide connected between said first input port and said first output port, and a second waveguide connected between said second input port and said second output port, wherein substantially no light is coupled between said first and second waveguides, and wherein said modulating signal causes relative phase shifts between the signals on said first and second output ports of said two-arm interferometer.

10. A system as in claim 8 wherein said splitter comprises a directional coupler having first and second input ports and first and second output ports, wherein light from the optical source is coupled onto said first input port.

11. A system as in claim 8 wherein the said splitter comprises a Y-junction having an input port used to couple light from said optical source, and two output ports.

12. A system as in claim 4 wherein said integrated-optical device comprises a Y-fed directional coupler having one optical input port and at least two optical output ports, wherein said optical source is coupled to at least two optical channels which may transfer optical power from each other as controlled by the electric modulating signal by means of electrode structures in proximity to the optical channels.

13. A system as in claim 4 wherein said integrated optic device comprises:
   a bulk optic beamsplitter, having an input port coupled to said optical source, and having a first and a second output port;
   a two-arm interferometer having a first input port coupled to said first output port of said bulk optic beamsplitter, a second input port coupled to said second output port of said bulk optic beamsplitter, and a first and a second output port; and
   a directional coupler having a first input port coupled to said first output port of said two-arm interferometer, a second input port coupled to said second output port of said two-arm interferometer, and at least two output ports 14. A system as in claims 8, 10, or 13 wherein said directional couplers further comprise biasing electrodes in order to control the static splitting ratio between the two output ports to a balanced bias point wherein the optical powers in the two ports are substantially equal.

15. An optical system as in claim 1 wherein said modulation signal comprises an analog signal.

16. A system as in claim 15 wherein said modulating signal comprises a frequency division multiplexed amplitude modulated vestigial sideband multichannel signal.

17. A system as in claim 1 wherein the optical source comprises a solid state diode pumped laser running at substantially constant output power.

18. A system as in claim 17 wherein the solid state laser comprises a Nd:YAG rod or ring laser providing output at approximately 1.3 micrometer wavelength, which is pumped by a high power laser diode array.

19. A system as in claim 1 wherein the optical source comprises a distributed feedback semiconductor laser, external cavity laser, or solid state laser running at constant output power at approximately 1.3 micrometer or approximately 1.5 micrometer wavelength.

20. A system as in claim 1 wherein said modulation signal serves to cause said modulation means to impress modulation envelopes of opposite polarities on said complementary optical output signals.

21. A system as in claim 1 wherein said means for detecting comprise photodetectors.

22. A system as in claim 1 wherein said modulation signals comprise analog signals.

23. A system as in claim 1 wherein said modulation signals comprise electrical signals.

24. A system as in claim 1, wherein said complementary optical output signals are multiplexed as a single optical beam having a first polarization component corresponding to a first of said complementary optical output signals and a second polarization component corresponding to a second of said complementary optical output signals.

25. A system as in claim 24 wherein said single optical beam is transmitted on one or more optical fibers.

26. A system as in claim 24 wherein said transmitter further comprises means to modulate the amplitudes of said two polarization components of said single optical beams in a complementary manner such that when the amplitude of one polarization component increases, the amplitude of the other polarization component decreases.

27. A system as in claim 24 wherein said first and second means for coupling comprise a single set of one or more optical fibers carrying said single optical beam.

28. A system as in claim 24 wherein said balanced optical receiver further comprises polarization diversity means to demultiplex said two polarization components to allow separate detection.

29. A system as in claim 24 which further comprises means located in one or more of said transmitter, said receiver, and said channel, to maintain balance between said two polarization channels.

30. A system as in claim 24 wherein said means for coupling comprises polarization preserving fiber in order to substantially preserve polarization balance between said complementary optical output signals.

31. An optical transmission or distribution system comprising:
   a transmitter comprising:
      an optical source; and
      an optical modulator having an optical input port coupled to said optical source, complementary optical output ports for providing complementary optical output signals, and a modulation port for receiving a modulation signal carrying information to be distributed within said system;
   two optical transmission channels comprising one or more optical fibers; and
   a balanced optical receiver, located at a distance from said transmitter, comprising:
      a first and a second optical input port;
      a first means for coupling a first of said optical transmission channels to said first optical input port of said balanced optical receiver;
      a second means for coupling a second of said optical transmission channels to said second optical input port of said balanced optical receiver;
      first means for detecting said first of said complementary signals and providing a first detected signal;
      second means for detecting said second of said complementary signals and providing a second detected signal; and
      means for subtracting said first and second detected signals in order to cancel spurious signals that are common to said two complementary optical output signals while reenforcing the useful signal containing the information carried by said modulation signal.

32. A system as in claim 31 wherein said one or more optical fibers of said first means for coupling and said one or more optical fibers of said second means for coupling are matched in optical length such that the optical modulation envelopes have opposite polarities at said optical input ports of said balanced optical receiver.

33. An optical transmission or distribution system comprising:
   a transmitter comprising:
      an optical source; and
      an optical modulating means having at least one optical input port coupled to said optical source, a modulation port for receiving a modulating signal, and complementary output ports for providing complementary modulated optical output signals in response to said modulating signal, said complementary optical output signals being multiplexed as a single optical beam having a first polarization component corresponding to a first of said complementary optical output signals and a second polarization component corresponding to a second of said complementary optical output signals, wherein said optical modulating means, in response to said modulating signal, extracts power from one of said optical output signals and applies the extracted power to the other optical output signal, on an instantaneous basis, thereby maintaining the sum of the power contained in said complementary output signals substantially constant;

an optical receiver located at a distance from said transmitter wherein said optical receiver includes polarization diversity means to demultiplex said two polarization components to allow separate detection;

an optical transmission channel comprising an optical fiber serving to couple said single optical beam to said optical receiver; and means located in one or more of said transmitter, said receiver, and said channel, to maintain balance between said two polarization channels, said means to maintain balance operating by substantially maintaining the DC operating point of the state-of-polarization of said single optical beam at said receiver to a state tilted at approximately 45 degrees with respect to the polarization detection axes of said polarization diversity means, with respect to which the polarization of said single optical beam varies according to said modulation signal.

34. An optical transmission or distribution system comprising:
a transmitter comprising:
an optical source; and
an optical modulating means having at least one optical input port coupled to said optical source, a modulation port for receiving a modulating signal, and complementary output ports for providing complementary modulated optical output signals in response to said modulating signal, said complementary optical output signals being multiplexed as a single optical beam having a first polarization component corresponding to a first of said complementary optical output signals and a second polarization component corresponding to a second of said complementary optical output signals,
wherein said optical modulating means, in response to said modulating signal, extracts power from one of said optical output signals and applies the extracted power to the other optical output signal, on an instantaneous basis, thereby maintaining the sum of the power contained in said complementary output signals substantially constant;
a polarization diversity receiver located at a distance from said transmitter wherein said receiver includes polarization diversity means to demultiplex said two polarization components to allow separate detection;
an optical transmission channel comprising an optical fiber serving to couple said optical beam to said optical receiver; and
polarization control means comprising:
a polarization transforming means to control the state of polarization at the input of said polarization diversity means;
means for detecting the imbalance between said two complementary optical output signals at said input of said polarization diversity means; and
feedback means for controlling said polarization control means in response to said means for detecting the imbalance, thereby maintaining a state-of-polarization bias point balanced between two polarizations of said polarization diversity receiver.

35. A system as in claim 34 wherein said polarization control means is included in said receiver before said polarization diversity means.

36. A system as in claim 34 wherein said polarization transforming means is included in said transmitter, said means for detecting the imbalance in polarization is included in said receiver, and which further comprises signalling means to close the control loop between said means for detecting and said polarization control means.

37. A system as in claim 36 wherein said signalling means comprises means for causing an optical signal to be transmitted through said fiber from said receiver to said transmitter.

38. A system as in claim 36 which combines the functions of polarization modulation and state of polarization balance biasing functions in the same device.

39. A system as in claim 38 wherein the device used for polarization modulation and balancing comprises at least one integrated optic TE-TM mode converter in tandem with at least one phase modulator.

40. A system as in claim 39 wherein functions of the mode converter and the phase modulator of the polarization controller-modulator are combined in the same waveguide by using two sets of electrodes, one set affecting the phase shift in the waveguide, the other electrode affecting the TE-TM mode conversion.

41. An optical transmission or distribution system comprising:
a transmitter comprising:
an optical source; and
an optical modulating means comprising an electro-optic modulator having at least one optical input port coupled to said optical source, a modulation port for receiving an electrical modulating signal, and complementary output ports for providing complementary modulated optical output signals in response to said modulating signal, said electro-optical modulator comprising an integrated-optic balanced bridge interferometer which includes:
an integrated optic splitter having an input port and a first and a second output port;
a two-arm interferometer having a first input port connected to said first output port of said first directional-coupler, a second input port connected to a said second output port of said first directional-coupler, and a first and a second output port;
a directional coupler having a first input port connected to said first output port of said two-arm interferometer, a second input port connected to said second output port of said two-arm interferometer, and at least two output ports; and
a first waveguide connected between said first input port and said first output port, and a second waveguide connected between said second input port and said second output port, wherein substantially no light is coupled between said first and second waveguides, and wherein said modulating signal causes relative phase shifts between the signals on said first and second output ports of said two-arm interferometer; and means for receiving electrical modulating and bias signals, wherein said optical modulating means, in response to said modulating signal, extracts power from one of said optical output signals and applies the extracted power to the other optical output signal, on an instantaneous basis, thereby maintaining the sum of the power contained in said complementary output signals substantially constant;

one or more optical receivers located at a distance from said transmitter; and at least two optical transmission channels comprising one or more optical fibers serving to couple each of said complementary optical output ports of said optical transmitter to associated ones of said one or more optical receivers.

42. An optical transmission or distribution system comprising:

a transmitter comprising:
an optical source; and
an optical modulator having an optical input port coupled to said optical source, complementary optical output ports for providing complementary optical output signals, and a modulation port for receiving a modulation signal;

two optical transmission channels comprising one or more optical fibers; and a balanced optical receiver, located at a distance from said transmitter, comprising:
a first and a second optical input port;
a first means for coupling a first of said optical transmission channels to said first optical input port of said balanced optical receiver;
a second means for coupling a second of said optical transmission channels to said second optical input port of said balanced optical receiver;
first means for detecting said first of said complementary signals and providing a first detected signal;
second means for detecting said second of said complementary signals and providing a second detected signal; and
means for subtracting said first and second detected signals in order to cancel spurious signals that are common to said two complementary optical output signals while reenforcing the useful signal wherein said modulation signal serves to cause said optical modulator to impress modulation envelopes of opposite polarities on said complementary optical output signals.

43. An optical transmission or distribution system comprising:

a transmitter comprising:
an optical source; and
an optical modulator having an optical input port coupled to said optical source, complementary optical output ports for providing complementary optical output signals, and a modulation port for receiving a modulation signal;

two optical transmission channels comprising one or more optical fibers; and a balanced optical receiver, located at a distance from said transmitter, comprising:
a first and a second optical input port;
a first means for coupling a first of said optical transmission channels to said first optical input port of said balanced optical receiver;
a second means for coupling a second of said optical transmission channels to said second optical input port of said balanced optical receiver;
first means for detecting said first of said complementary signals and providing a first detected signal;
second means for detecting said second of said complementary signals and providing a second detected signal wherein said first and second means for detecting including first and second photodetectors, respectively; and
means for subtracting said first and second detected signals in order to cancel spurious signals that are common to said two complementary optical output signals while reenforcing the useful signal.

44. An optical transmission or distribution system comprising:

a transmitter comprising:
an optical source; and
an optical modulator having an optical input port coupled to said optical source, complementary optical output ports for providing complementary optical output signals, and a modulation port for receiving an analog modulation signal;

two optical transmission channels comprising one or more optical fibers; and a balanced optical receiver, located at a distance from said transmitter, comprising:
a first and a second optical input port;
a first means for coupling a first of said optical transmission channels to said first optical input port of said balanced optical receiver;
a second means for coupling a second of said optical transmission channels to said second optical input port of said balanced optical receiver;
first means for detecting said first of said complementary signals and providing a first detected signal;
second means for detecting said second of said complementary signals and providing a second detected signal; and
means for subtracting said first and second detected signals in order to cancel spurious signals that are common to said two complementary optical output signals while reenforcing the useful signal.

45. An optical transmission or distribution system comprising:

a transmitter comprising:
an optical source; and
an optical modulator having an optical input port coupled to said optical source, complementary optical output ports for providing complementary optical output signals, and a modulation port for receiving an electrical modulation signal;

two optical transmission channels comprising one or more optical fibers; and a balanced optical receiver, located at a distance from said transmitter, comprising:
a first and a second optical input port;
a first means for coupling a first of said optical transmission channels to said first optical input port of said balanced optical receiver;

a second means for coupling a second of said optical transmission channels to said second optical input port of said balanced optical receiver;

first means for detecting said first of said complementary signals and providing a first detected signal;

second means for detecting said second of said complementary signals and providing a second detected signal; and means for subtracting said first and second detected signals in order to cancel spurious signals that are common to said two complementary optical output signals while reenforcing the useful signal.

46. An optical transmission or distribution system comprising:

a transmitter comprising:

an optical source; and an optical modulator having an optical input port coupled to said optical source, complementary optical output ports for providing complementary optical output signals, and a modulation port for receiving a modulation signal wherein said complementary optical output signals are multiplexed as a single optical beam having a first polarization component corresponding to a first of said complementary optical output signals and a second polarization component corresponding to a second of said complementary optical output signals;

an optical transmission channel comprising an optical fiber through which propagates said optical beam; and a balanced optical receiver, located at a distance from said transmitter, comprising:

a first and a second optical input port;

a first means for coupling said optical fiber to said first optical input port of said balanced optical receiver;

a second means for coupling a second of said optical transmission channels to said second optical input port of said balanced optical receiver;

first means for detecting said first of said complementary signals and for providing a first detected signal;

second means for detecting said second of said complementary signals and for providing a second detected signal; and means for subtracting said first and second detected signals in order to cancel spurious signals that are common to said two complementary optical output signals while reenforcing the useful signal.

* * * * *